US008381045B2

(12) United States Patent
Ben-Yehuda et al.

(10) Patent No.: US 8,381,045 B2
(45) Date of Patent: Feb. 19, 2013

(54) CONDITION BASED DETECTION OF NO PROGRESS STATE OF AN APPLICATION

(75) Inventors: Shmuel Ben-Yehuda, Hafia (IL); Dan Pelleg, Hafia (IL); Lance Warren Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/454,893

(22) Filed: Apr. 24, 2012

(65) Prior Publication Data

US 2012/0210175 A1    Aug. 16, 2012

Related U.S. Application Data

(63) Continuation of application No. 12/792,268, filed on Jun. 2, 2010.

(51) Int. Cl.
*G06F 11/00* (2006.01)
(52) U.S. Cl. ............................................ 714/48; 714/10
(58) Field of Classification Search .................. 714/48
See application file for complete search history.

(56) References Cited

U.S. PATENT DOCUMENTS

| | | | | |
|---|---|---|---|---|
| 6,993,681 | B2 * | 1/2006 | Haynes et al. | 714/23 |
| 7,426,652 | B2 * | 9/2008 | Liccione et al. | 714/3 |
| 7,577,550 | B2 | 8/2009 | Ozonat et al. | |
| 2003/0196136 | A1 * | 10/2003 | Haynes et al. | 714/13 |
| 2007/0028219 | A1 | 2/2007 | Miller et al. | |
| 2007/0179746 | A1 | 8/2007 | Jiang et al. | |
| 2007/0255977 | A1 * | 11/2007 | Liccione et al. | 714/4 |
| 2008/0022282 | A1 * | 1/2008 | Cherkasova et al. | 718/102 |
| 2009/0031176 | A1 | 1/2009 | Ide et al. | |
| 2009/0199196 | A1 * | 8/2009 | Peracha | 718/104 |
| 2009/0257352 | A1 * | 10/2009 | Imai | 370/241 |
| 2010/0146260 | A1 * | 6/2010 | Levow et al. | 713/154 |

OTHER PUBLICATIONS

Kai Shen et al., I/O System Performance Debugging using Model-Driven Anomaly Characterization, 4th USENIX Conference on File and Storage Technologies, 309-22, 2005, USENIX Association.
Kai Shen et al., Reference-Driven Performance Anomaly Identification, Sigmetrics/Performance'09—Proceedings of the 11th International Joint Conference on Measurement and Modeling of Computer Systems, v 37, n 1, p. 85-96, 2009, Association for Computing Machinery.

* cited by examiner

*Primary Examiner* — Kamini Patel
(74) *Attorney, Agent, or Firm* — Garg Law Firm, PLLC; Rakesh Garg; Libby Z. Toub

(57) ABSTRACT

A method for condition based detection of a no progress state of an application are provided in the illustrative embodiments. A resource usage and an output of a set of applications including the application are monitored. The resource usage and the output are measured to determine a resource usage value and an output value at a first time. A present condition is detected under which the set of applications is executing. A determination is made whether the resource usage value is included in a sub-range of a resource usage scale and the output value is included in a sub-range of an output scale where the sub-range of the resource usage scale corresponds to the sub-range of the output scale for the present condition. The no progress state of the application is detected if the determination is negative.

9 Claims, 4 Drawing Sheets

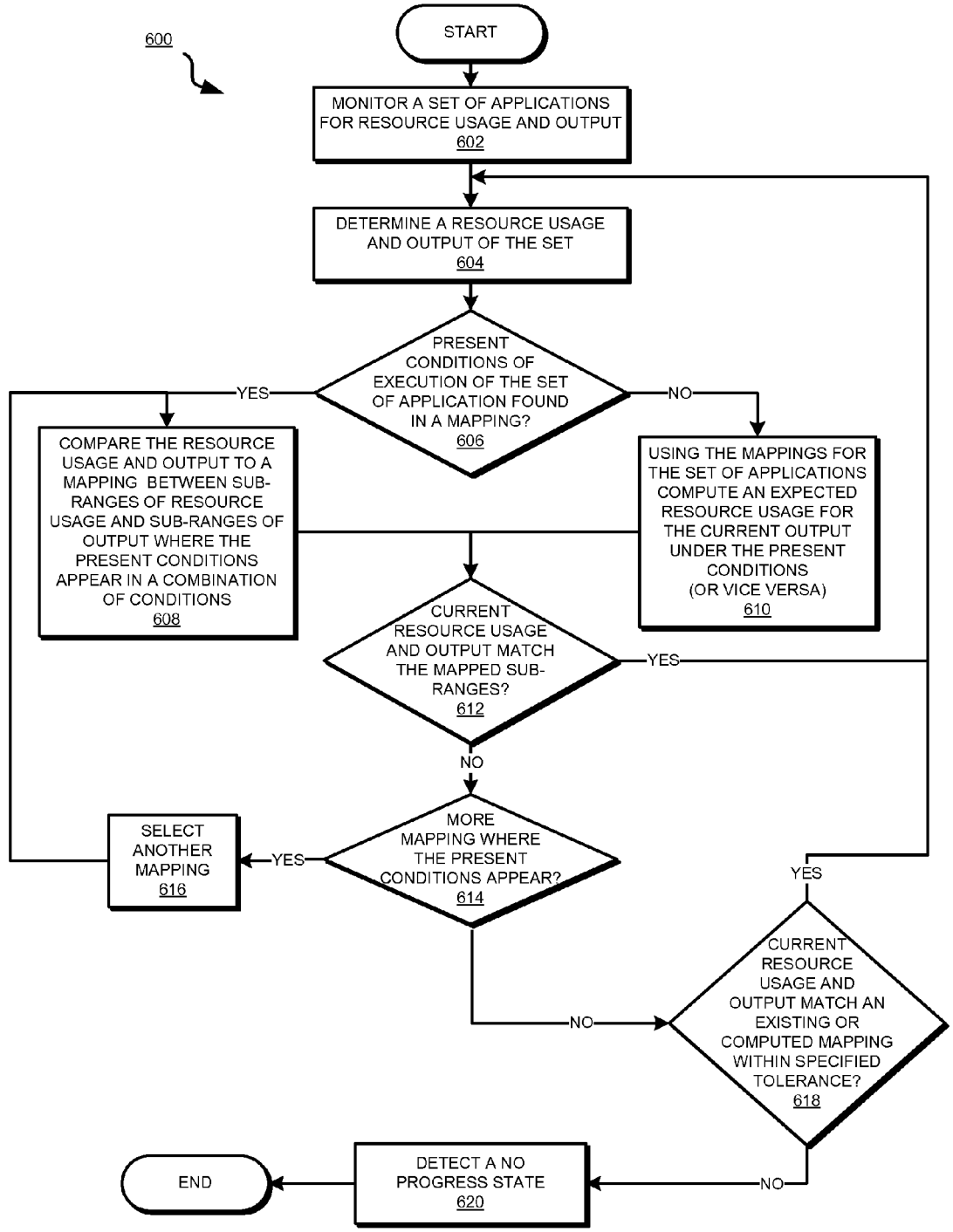

CONDITION BASED DETECTION OF NO PROGRESS STATE OF AN APPLICATION

RELATED APPLICATION

The present invention is related to similar subject matter of co-pending and commonly assigned U.S. patent application Ser. No. 12/762,226 entitled "DETECTING NO PROGRESS STATE OF AN APPLICATION," filed on Apr. 16, 2010, which is hereby incorporated by reference.

BACKGROUND OF THE INVENTION

1. Field of the Invention

The present invention relates generally to an improved data processing system, and in particular, to a computer implemented method for monitoring a data processing system's performance. Still more particularly, the present invention relates to a computer implemented method for condition based detection of no progress state of an application executing in a data processing system.

2. Description of the Related Art

Circumstances present in a data processing system influence the execution of applications therein. For example, a data processing system has to be able to provide suitable resources to an application for the application to execute as intended. As another example, a processor has to be available to execute the instructions associated with an application in a timely manner for the performance of the application to be within an acceptable range.

Under certain circumstances, an application may fail to perform an intended function. In many cases, upon such a failure, an application enters an error state. For example, an error state may be that the application crashes or exits execution unexpectedly. Another example of an error state may be that the application reports an error code corresponding to a failed operation.

Other applications, such as an operating system of the data processing system, include functions for detecting the error states presented by the executing applications. Such applications can then take suitable actions to maintain the data processing system's stability and performance. For example, an operating system may terminate a process associated with the application and free the resources tied up by that process. As another example, a monitoring application may trap the error code generated by an application and cause the application to gracefully exit execution to perform another operation.

Under certain circumstances, an application may not enter an error state but the continued execution of the application may be undesirable in other respects. Detecting such conditions in a data processing system is difficult, presently unavailable, and desirable for improved performance of the data processing system.

SUMMARY OF THE INVENTION

The illustrative embodiments provide a method for condition based detection of no progress state of an application. An embodiment monitors a resource usage and an output of a set of applications, the set of applications including the application, the application executing in a data processing system. The embodiment measures the resource usage and the output to determine a resource usage value and an output value at a first time. The embodiment detects a present condition under which the set of applications is executing in the data processing system. The embodiment determines whether the resource usage value is included in a sub-range of a resource usage scale and the output value is included in a sub-range of an output scale where the sub-range of the resource usage scale corresponds to the sub-range of the output scale for the present condition. The embodiment detects the no progress state of the application responsive to the determination being negative.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a flowchart of an example process of detecting a no progress state of an application in accordance with an illustrative embodiment.

DETAILED DESCRIPTION OF THE PREFERRED EMBODIMENT

Figure 1:
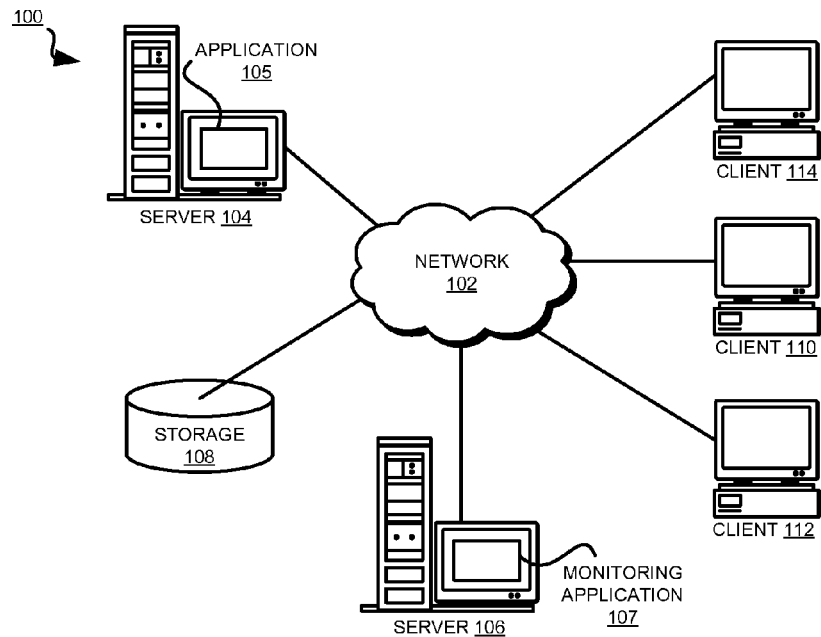
FIG. 1 depicts a pictorial representation of a network of data processing systems in which illustrative embodiments may be implemented.

The invention recognizes that under certain circumstances, continued execution of an application may not be desirable even though the application has not entered an error state. A "no progress" state is such a state of execution of an application. A no progress state is a state of execution of an application where the application continues to consume or reserve resources without producing suitable or expected output.

For example, the invention recognizes that an application may continue to wait for a prolonged period for a particular resource to become available. While waiting, the application may continue to lock or consume other resources without producing any output, or producing lower than expected or threshold volume of output. In other words, the application may be in a no progress state.

Because the application does not produce an error or enter an error state while waiting, an operating system may deem the application to be healthy and allow the application to continue to execute in the no progress state. The invention recognizes that allowing such no progress state to go undetected wastes computing resources and may even deteriorate the overall system performance.

As another example, the invention recognizes that an application may include an error that causes a computation to consume a large amount of processor cycles without producing a result. Again, the application may be executing in a no progress state. Again, the operating system may deem the application healthy as the application simply keeps performing the computation without entering an error state. The invention recognizes that allowing such no progress state to go undetected wastes computing resources and may even deteriorate the overall system performance.

The invention recognizes that an application may enter a no progress state for many other reasons. Some additional reasons that may cause the no progress state of an application may be bugs in the software, errors in the configuration of the application, and overloading of system resources.

The invention further recognizes that an application may also enter a no progress state if an algorithm therein performs as expected for most scenarios but the application experiences a scenario for which the algorithm may be inefficient. In a no progress state addressed by an embodiment of the invention, an application may make progress and produce output but such progress or output is below a threshold value. In another variation of a no progress state addressed by an embodiment of the invention, an application may produce no output or make no progress at all within a defined period. In another variation of a no progress state addressed by an embodiment of the invention, an application may eventually make progress and produce a result, but such progress may be after consuming such time or amount of resources as may be above a threshold or otherwise unacceptable.

The invention also recognizes that monitoring output level alone of an application may also be insufficient for detecting the no progress state of the application. For example, output of an application is often influenced by the demands being placed on the application. With increasing interactivity with the application, a proportionately increased output can generally be expected. Conversely, a below threshold level of output may only be an indication of a low level of activity with or within the application, and not necessarily an indication of a no progress state of the application.

The illustrative embodiments used to describe the invention generally address and solve the above-described problems and other problems related to no progress state of an application executing in a data processing system. The illustrative embodiments provide a method for condition based detection of the no progress state of the application.

Given existing conditions in a data processing environment, an embodiment of the invention may enable detection of applications that are consuming or reserving resources without producing desirable outputs. An embodiment may allow detecting the no progress state of an application under a variety of conditions in the data processing environment, conditions of the application itself, or a combination thereof. An embodiment may also facilitate deducing a no progress state of an application under conditions previously unseen or unrecorded.

An embodiment may enable existing error state detection functions to successfully detect no progress state of applications as well. An embodiment may be integrated in, or may operate in conjunction with, such existing functions.

The illustrative embodiments are described with respect to data, data structures, and identifiers only as examples. Such descriptions are not intended to be limiting on the invention. For example, an illustrative embodiment described with respect to number of pages output from a web server may be implemented using number of queries served from a database in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
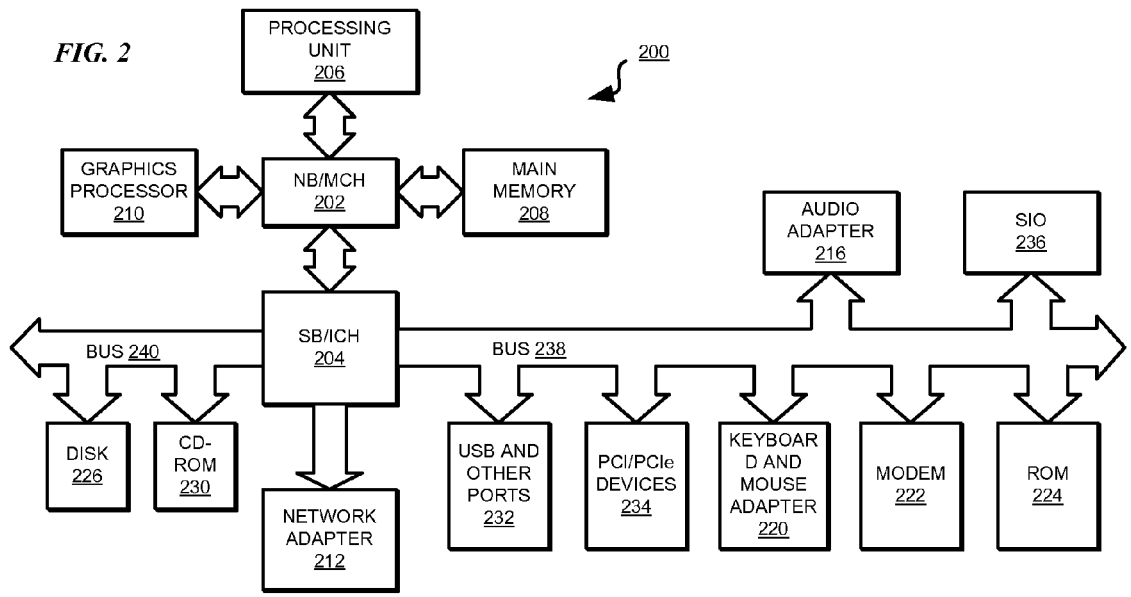
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105. Server 106 may include monitoring application 107. Monitoring application 107 may include an implementation of an embodiment of the invention.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
FIG. 3 depicts a block diagram of a general principle of operation of applications with respect to which an illustrative embodiment can be implemented.

With reference to FIG. 3, this figure depicts a block diagram of a general principle of operation of applications with respect to which an illustrative embodiment can be implemented. Application 302 may be similar to application 105 in FIG. 1.

Application 302 consumes set of resources 304 and produces set of output 306. A set of resources is any amount of one or more types of resources consumed in performing computations. Processor cycles, memory space, network bandwidth, data, and electrical power are some examples of resource 304. Resource 304 is resources consumed by application 302. "Resources consumed" according to an embodiment include those resources that are actually consumed, used, or utilized by an application, as well as those resources that are locked, reserved, or otherwise held for present or future use by the application.

A set of output is one or more output of any type of an application. Data transmitted, data stored, entry recorded, notification sent, data published, printout generated, information displayed, and information manipulated are some examples of output 306 possible from an application executing in a data processing system.

A monitoring application according to an embodiment observes or monitors an example set of applications executing in a data processing system for resources consumed and output produced during a training period. A set of applications is all or parts of one or more applications executing in the same or different data processing systems. Within the scope of the invention, a set of applications may include certain processes associated with an application and exclude certain other processes associated with an application. Thus, a set of applications may include one or more processes, threads, or executables associated with one or more applications executing in one or more data processing systems.

When an application in the set is executing on a data processing system different from the data processing system of another application, the two applications belong in the set of applications if the execution of the first application has some effect on the execution of the second application. For example, two applications in a set may execute on different data processing systems, but certain processes associated with the two applications may compete for a common resource over a network.

A training period is a time period within which an application is deemed to be operating as expected. In other words, the behavior of an application is predictable or as specified under the known circumstances of the application execution, and the application is not in a no progress state, during the training period. The training period may be one or more consecutive or disjoint periods.

The monitoring application according to an embodiment charts the resources consumed by the set of applications in the training period on a resource usage scale. The monitoring application charts the output produced by the set of applications during the training period on an output scale. The monitoring application may create any number of sub-ranges within the resource usage and output scales. A sub-range is a portion of a range between two threshold values.

The recourse consumption and the output produced by an application or a set of applications is related to one or more conditions existing in the data processing environment or one or more conditions of an application. A condition is any event, setting, or configuration of an application or a data processing system that affects the performance of that application or a different application.

For example, an application may execute in a data processing system with an assigned priority. The priority is an example condition that affects the performance, resource consumption, and output of the application. As an example, an application may execute with one of two example priorities—high and low—in an example data processing system. When executing with a low priority, the application may not receive as much computing resources as the application may when executing with a high priority. In an example normal operation, the application may correspondingly produce less output under low priority as compared to the output measure under high priority. The low measure of output under low priority may not be an indication of no progress state of the application but the same low measure of the output may indicate a no progress state of the application under high priority operation. Other levels of application priority may be incorporated into an embodiment in a similar manner.

As another example, a configuration of a data processing system may be another condition affecting the performance of an application executing thereon. For example, when the data processing system is configured with 10 Gigabyte (GB) of available memory the output of an application may be 1-2 units for x units of resource consumption. When configured with 20 GB of memory, the output may be 3-4 units under normal operations with x units of resource consumption. Accordingly, if the application produces 1-2 units of output when the condition is that the data processing system has 20 GB of memory available, the application may be in a no progress state.

As another example, a configuration of a data processing environment may be another condition affecting the performance of an application. For example, a network may be used by a data processing system on which the application may be executing. An increase in the available bandwidth in the network, such as by an upgrade from a 100 Megabits per second (MBPS) network to a Gigabit network, may be a condition. The application may output 1-2 units for x units of resource consumption when utilizing the 100 MBPS network. When Gigabit network is available, the application's output may be 3-4 units under normal operations with x units of resource consumption. Accordingly, if the application produces 1-2 units of output when the condition is that the network is operating with Gigabit bandwidth, the application may be in a no progress state.

The above conditions are described only as examples for understanding the different types of conditions that may affect application performance. These example conditions are not intended to be limiting on the invention. Many other conditions related to the application, the data processing system, the data processing environment, or a combination thereof will be apparent from this disclosure to those of ordinary skill in the art and the same are contemplated within the scope of the invention. For example, a configuration of the application, such as a timeout parameter, may change the amount of output produced for the same amount of resource consumption. This and other configuration parameters of an application may also participate in an embodiment as conditions within the scope of the invention.

Furthermore, more than one condition may affect an application's performance in combination. For example, an application's timeout parameter may be changed and the network bandwidth may also change during a monitoring period. Generally, one or more conditions may be combined in any manner for mapping corresponding sub-ranges on the resource usage and output scales. For example, two or more conditions may be combined using Boolean operators for a particular correspondence between a sub-range of the resource usage scale and a sub-range of the output scale to be effective. Conditions may be combined using logic of any complexity within the scope of the invention.

Figure 4:
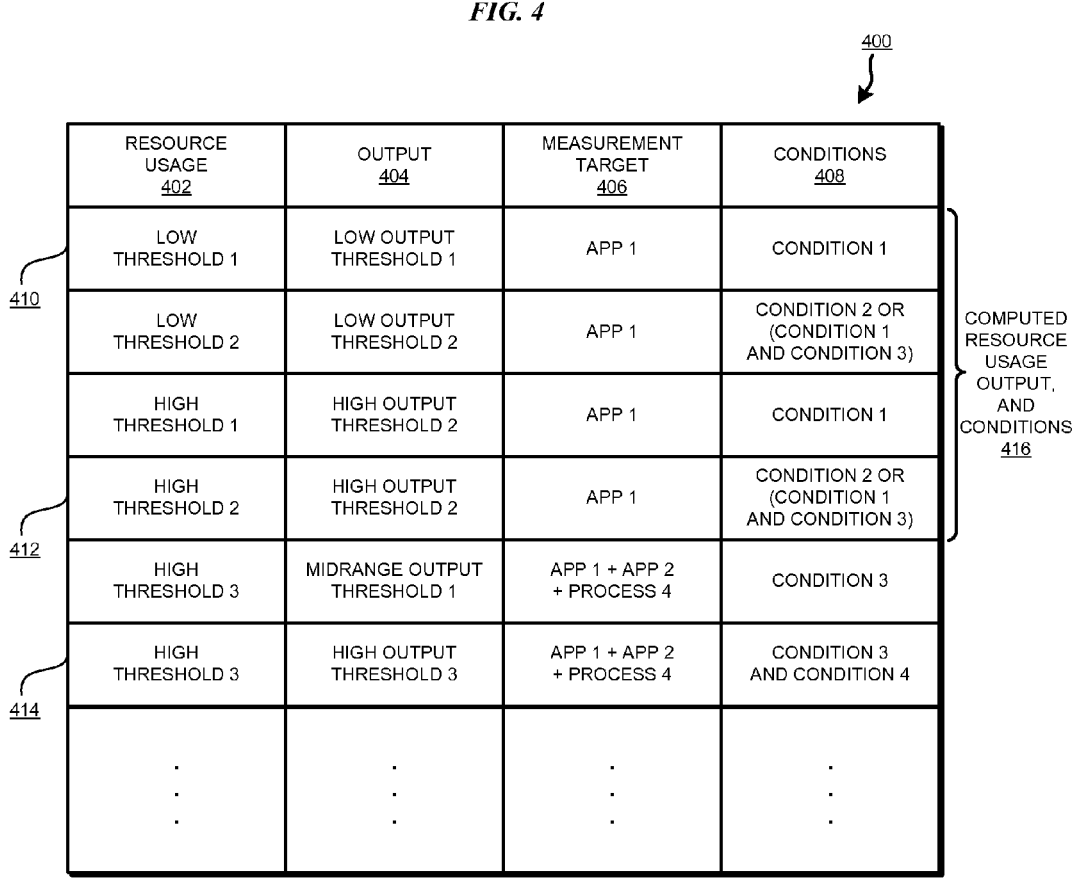
FIG. 4 depicts an example mapping maintained by a monitoring application in accordance with an illustrative embodiment.

With reference to FIG. 4, this figure depicts an example mapping maintained by a monitoring application in accordance with an illustrative embodiment. Table 400 may be an example way of storing the mapping of sub-ranges as described elsewhere in the disclosure, together with a set of conditions under which particular mappings are effective. In an implementation, table 400 may be substituted by any other suitable form of documenting the mapping of resource usage sub-ranges, output sub-ranges, and the related combination of conditions for sets of applications.

As an example, table 400 may store the mapping of resource usage sub-ranges to output sub-ranges for one or more sets of applications, or other combinations of applications, processes, threads, or executables, under a combination of a set of conditions. A set of conditions is one or more conditions. Table 400 may store a resource usage sub-range information in column 402, an output sub-range information in column 404, and information, such as an identifier, of the corresponding set of applications in column 406. Table 400 may further store one or more combinations of sets of conditions in column 408.

A row of data in table 400 forms one mapping for a given set of applications under the given combination of conditions. Table 400 may maintain one or more rows of mapping for a particular set of applications, for example, for different combinations of conditions.

Table 400 shows some example mappings for the clarity of the illustrative embodiment. Row 410 depicts a mapping of an identifier of a sub-range of resource usage scale, "Low threshold 1," to an identifier of a sub-range of an output scale, "low output threshold 1," for a set of applications that includes only application "App. 1." Row 410 indicates that the mapping between the resource usage and the output for App. 1 is effective or expected when condition identified by identifier "condition 1" exists.

As another example, Row 412 depicts a mapping of an identifier of a sub-range of resource usage scale, "high threshold 2," to an identifier of a sub-range of an output scale, "high output threshold 2," for a set of applications that includes application "App. 1." Row 412 indicates that the mapping between the resource usage and the output for App. 1 is effective or expected when either condition identified by identifier "condition 2" exists, or when both condition "condition 1" and condition "condition 3" exist.

As another example, Row 414 depicts a mapping of an identifier of a sub-range of resource usage scale, "high threshold 3," to an identifier of a sub-range of an output scale, "high output threshold 3," for a set of applications that includes application "App. 1," application "App. 2," and process "process 4." Row 414 indicates that the mapping between the resource usage and the output for App. 1, App. 2, and process 4 is effective or expected when both condition "condition 3" and condition "condition 3" exist.

Under certain circumstances, the resource usage for a given output, or the output for a given resource usage, may not correspond to any row in table 400. For example, the combination of a set of conditions prevailing in the data processing environment at a given time may not correspond to conditions in column 408 of any row of table 400. An embodiment may be able to compute, generalize, extrapolate, or otherwise determine additional sub-ranges of resource usage and outputs. The embodiment may further compute, generalize, extrapolate, or otherwise determine additional set of mappings between the determined sub-ranges for various combinations of conditions.

As an example, using all or part of the information pertaining to application "App. 1" in table 400, an embodiment may compute, generalize, extrapolate, or otherwise determine computed resource usage, output, and conditions 416. In this manner, an embodiment may be able to rely on table 400 not only for the data contained therein but also for computing new mappings for unforeseen conditions.

Similarly, an embodiment may be able to reliably predict expected resource usage and output behavior of new sets of applications for which training data may not be available in table 400. Thus, an embodiment can expand, alter, or deduce new or changed information in table 400 about the behavior of existing or new sets of applications under new or changed conditions.

Sub-ranges, sets of applications, and combinations of conditions are represented by example identifiers in FIG. 4. A sub-range, a set of applications, or a combination of a set of conditions may be represented in table 400 in any manner suitable for an implementation. Further, note that the identified and mapped sub-ranges may be on different scales for different sets of applications. A single sub-range on one scale may map to more than one sub-range on the other corresponding scale for a given set of applications, such as for example, under different combinations of conditions.

Table 400 depicts other rows with other example variations of mappings within the scope of the invention. The structure of table 400 and the example mappings are not intended to be limiting on the invention. Table 400 may include any number of rows, different columns, and different ways of storing similar mapping information. Many other variations of the mappings will be apparent from this disclosure to those of ordinary skill in the art and the same are contemplated within the scope of the invention.

In certain instances, table 400 may not be implemented at all in the form shown. For example, in one embodiment, the table may be replaced with a set of rules that are created based on the training period resource usage and output data.

Furthermore, because table 400 may be implemented in a variety of ways, or may be absent all together, "mapping" refers to any method or technique of identifying a correspondence between a resource usage data, an output data, and a related combination of a set of conditions according to any embodiment of the invention. For example, mapping may be in the form of a set of logic instructions implemented in a rule that associate a resource usage measurement with an output measurement under certain conditions.

Figure 5:
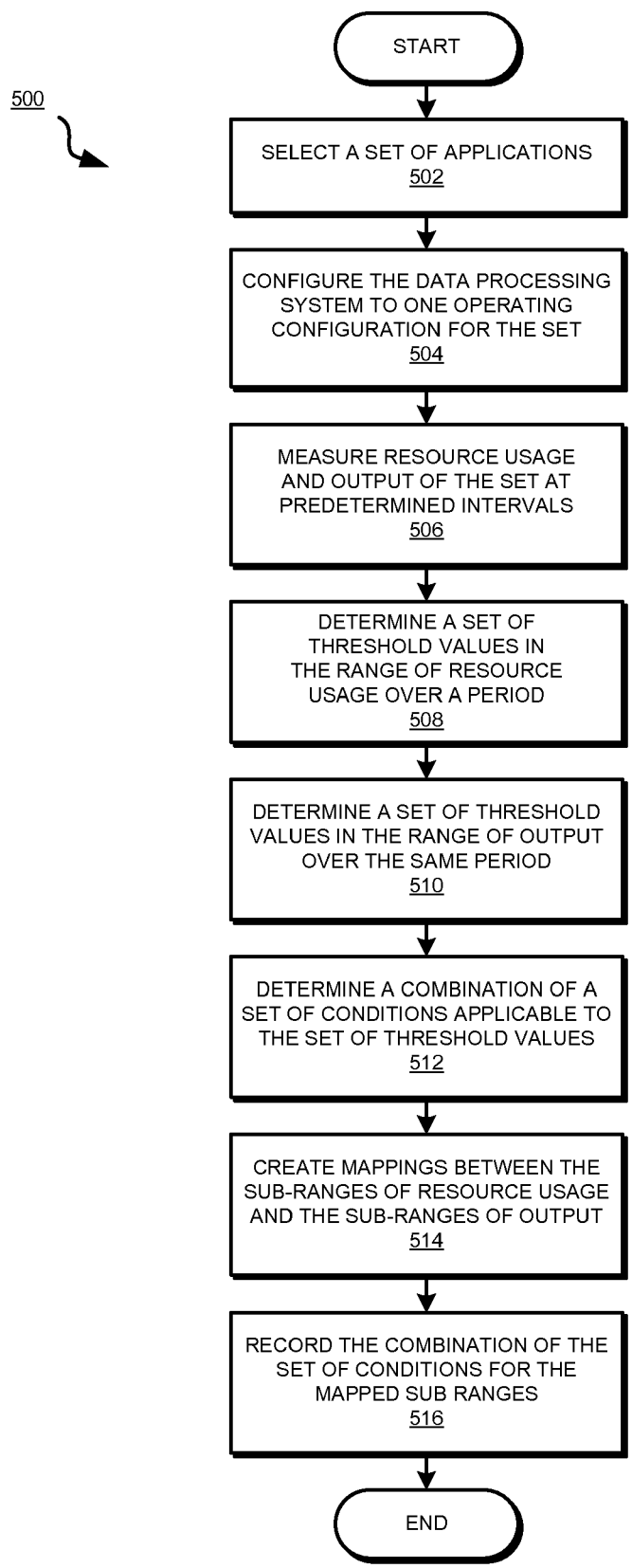
FIG. 5 depicts a flowchart of a process of training a monitoring application for detecting no progress state of an application in accordance with an illustrative embodiment.

With reference to FIG. 5, this figure depicts a flowchart of a process of training a monitoring application for detecting no progress state of an application in accordance with an illustrative embodiment. Process 500 may be implemented in a monitoring application such as monitoring application 107 in FIG. 1.

Process 500 begins by selecting a set of applications (step 502). The set of applications may be selected in any manner suitable for a particular implementation. For example, in one embodiment, the set of applications may be selected based on the workload that is expected to execute on a given data processing system. In another embodiment, the set of applications may be a specimen set having a particular configuration or behavior. Furthermore, the set may be selected manually, automatically, based on a heuristic, a combination thereof, or any other way within the scope of the invention.

Process 500 configures the data processing system to one operating configuration for the set (step 504). For example, in step 504, process 500 may create a condition, such as by configuring the set of applications to execute under a specified priority. As another example, process 500 may shutdown extraneous processes leaving only the set of applications and minimal system services running to maximize the available network bandwidth to the set of applications. Any suitable configuration that may facilitate creating different operating conditions, such as in FIG. 4, may be configured in step 504 without limitation.

Process 500 measures resource usage and output of the set during the training period, such as at a predetermined interval (step 506). For example, process 500 may perform the measurements at 1-second intervals for a particular set of applications and at 1-minute interval for another set. Process 500 may also synchronize the measurement with a system heartbeat rate or other suitable periods or intervals.

Process 500 determines a set of thresholds within the range of resource usage over the training period (step 508). Process 500 determines a set of thresholds within the range of output over the training period (step 510). The thresholds mark the beginnings and ends of sub-ranges of resource usage and output as described elsewhere in this disclosure. Process 500 determines a combination of a set of conditions applicable to the set of threshold values (step 512).

Process 500 creates one or more mappings between the sub-ranges of resource usage and the sub-ranges of outputs (step 514). Process 500 records the combination of the set of conditions for the mapped sub ranges (step 516). Process 500 ends thereafter.

With reference to FIG. 6, this figure depicts a flowchart of an example process of detecting a no progress state of an application in accordance with an illustrative embodiment. Process 600 may be implemented in a monitoring application, such as monitoring application 107 in FIG. 1.

Process 600 begins by monitoring a set of applications for resource usage and output produced (step 602). Process 600 determines a measure of resource usage and output related to the set of applications (step 604).

Process 600 determines whether the combination of the conditions present at the time of the measurement of step 604 are found in a mapping, such as in table 400 in FIG. 4 (step 606). If the conditions are present in a mapping ("Yes" path of step 606), process 600 compares the recourse usage and output to a mapping between sub-ranges of resource usage and sub-ranges of output where the present conditions appear in a combination of conditions (step 608). Process 600 proceeds to step 612 thereafter.

If the conditions are not present in a mapping ("No" path of step 606), using one or more mappings for the set of applications from the available mappings, process 600 computes an expected recourse usage for the current output (or vice versa) under the present conditions (step 610). Process 600 may record (not shown) the computations as new or modified mappings, such as in table 400 in FIG. 4. Process 600 proceeds to step 612 thereafter.

Process 600 determines whether the current recourse usage and current output match the mapped sub-ranges (step 612). In step 612, the mapped sub-ranges may be in an existing mapping or a mapping formed using the computations in step 610. If a match is found ("Yes" path of step 612, process 600 returns to step 604.

If a match is not found ("No" path of step 612), process 600 determines whether more mappings are present for related to the set of applications where the present conditions appear (step 614). If another mapping exists ("Yes" path of step 614), process 600 selects the other mapping (step 616). Process 600 returns to step 608 thereafter.

If another mapping does not exist ("No" path of step 614), process 600 determines whether the current resource usage and output match an existing or computed mapping within a specified tolerance (step 618). For example, an implementation may allow a current resource usage or output to fall within a specified tolerance value on each side of the thresholds that bound a corresponding sub-range in determining that a match exists.

If a match within the tolerance is found ("Yes' path of step 618), process 600 returns to step 604. If a match is not found even after the allowed tolerance ("No" path of step 618), process 600 detects a no progress state for the set of applications under the present conditions (step 620). Process 600 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for condition based detection of a no progress state of an application executing in a data processing system. Using an embodiment of the invention, a data processing system can identify applications that may have entered an undesirable state without indicating an error. Detecting such applications or parts thereof may allow the data processing system to perform administrative actions on the application and operate with improved resource usage efficiency.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for condition-based detection of a no progress state of an application, the computer implemented method comprising:
    monitoring a resource usage and an output of a set of applications, the set of applications including the application, the application executing in a data processing system;
    measuring the resource usage and the output to determine a resource usage value and an output value at a first time;
    detecting a present condition under which the set of applications is executing in the data processing system;
    determining whether the resource usage value is included in a sub-range of a resource usage scale and the output value is included in a sub-range of an output scale where the sub-range of the resource usage scale corresponds to the sub-range of the output scale for the present condition; and
    detecting the no progress state of the application responsive to the determination being negative.

2. The computer implemented method of claim 1, further comprising:
    computing, responsive to the determination being negative, a computed sub-range of the resource usage scale and a computed sub-range of the output scale where the computed sub-range of the resource usage scale corresponds to the computed sub-range of the output scale for the set of applications under the present condition; and
    further determining whether the resource usage value is included in the computed sub-range of the resource usage scale and the output value is included in the computed sub-range of the output scale, wherein the detecting is responsive to the further determination being negative.

3. The computer implemented method of claim 1, wherein the present condition is a combination of a set of conditions, the combination being a logical combination of conditions in the set of conditions.

4. The computer implemented method of claim 1, wherein the monitoring is performed over a monitoring period, further comprising:
    selecting the set of applications;
    configuring a set of data processing systems operation of the set of applications under a first condition, the set of data processing systems including the data processing system;
    measuring a resource usage and a output of the set of applications under the first condition at a predetermined interval during a training period;
    identifying a first set of thresholds in a range of resource usage over the training period, forming a set of resource usage sub-ranges between thresholds in the first set of thresholds;
    identifying a second set of thresholds in a range of output over the training period, forming a set of output sub-ranges between thresholds in the second set of thresholds; and
    mapping a resource usage sub-range to an output sub-range for the first condition.

5. The computer implemented method of claim 4, wherein the mapping indicates a measure of output to be expected for a given measure of resource usage under the first condition when no application in the set of applications is in the no progress state.

6. The computer implemented method of claim 4, wherein a resource usage sub-range in the set of resource usage sub-ranges is mapped to more than one output sub-ranges in the set of output sub-ranges for different combinations of conditions.

7. The computer implemented method of claim 1, further comprising:
    notifying a second application about the no progress state of the application.

8. The computer implemented method of claim 1, wherein the first time is within a monitoring period.

9. The computer implemented method of claim 1, wherein the application is detected to be in the no progress state when the resource usage value is included in the sub-range of the resource usage scale and the output value exceeds a corresponding sub-range of the output scale for the present condition.

* * * * *